United States Patent
Wang et al.

(10) Patent No.: US 10,577,242 B2
(45) Date of Patent: Mar. 3, 2020

(54) DEVICE AND METHOD FOR GENERATING HIGH-PURITY HYDROGEN BY BIOMASS PYROLYSIS-CHEMICAL LOOPING COMBUSTION

(71) Applicant: Tsinghua University, Beijing (CN)

(72) Inventors: Wei Wang, Beijing (CN); Xiuning Hua, Beijing (CN); Zhou Xia, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 107 days.

(21) Appl. No.: 15/633,076

(22) Filed: Jun. 26, 2017

(65) Prior Publication Data
US 2018/0002174 A1   Jan. 4, 2018

(30) Foreign Application Priority Data
Jun. 29, 2016  (CN) .......................... 2016 1 0499615

(51) Int. Cl.
| | |
|---|---|
| C01B 3/24 | (2006.01) |
| F22B 1/18 | (2006.01) |
| C01B 3/36 | (2006.01) |
| B01D 3/06 | (2006.01) |
| B01J 6/00 | (2006.01) |
| B01J 8/02 | (2006.01) |

(Continued)

(52) U.S. Cl.
CPC ............... *C01B 3/24* (2013.01); *B01D 3/06* (2013.01); *B01J 6/001* (2013.01); *B01J 8/0292* (2013.01);
(Continued)

(58) Field of Classification Search
CPC .................................................. C10J 3/725
See application file for complete search history.

(56) References Cited

U.S. PATENT DOCUMENTS

| | | | |
|---|---|---|---|
| 8,419,813 B2* | 4/2013 | Hoteit | C01B 3/36 |
| | | | 423/644 |
| 9,371,227 B2* | 6/2016 | Fan | C01B 3/063 |

(Continued)

FOREIGN PATENT DOCUMENTS

| | | |
|---|---|---|
| CN | 101392188 A | 3/2009 |
| CN | 102200277 A | 9/2011 |
| CN | 103062910 A | 4/2013 |

OTHER PUBLICATIONS

Hua X, Wang W., Chemical looping combustion: A new low-dioxin energy conversion technology. Journal of Environmental Sciences, 2015, 32: 135-145.

(Continued)

*Primary Examiner* — Matthew J Merkling
(74) *Attorney, Agent, or Firm* — Muncy, Geissler, Olds & Lowe, P.C.

(57) ABSTRACT

The present invention discloses a device and method for generating high-purity hydrogen by biomass pyrolysis-chemical looping combustion. The device comprises a biomass pyrolysis unit, a chemical looping hydrogen generation unit and a waste heat recovery unit; the biomass pyrolysis unit comprises a vertical bin, a screw feeder, a rotary kiln pyrolysis reactor and a high temperature filter; the chemical looping hydrogen generation unit comprises a path switching system of intake gas end, at least one packed bed reactor and a path switching system of tail gas end, wherein the packed bed reactor is composed of three parallel packed bed reactors I, II and III, which are continuously subjected to fuel reduction-steam oxidation-air combustion stages (steam purging stage) successively; the waste heat recovery unit comprises a waste heat boiler, a cooler and a gas-liquid separator. According to the present invention, a process flow of generating hydrogen from biomass is short, high-purity hydrogen can be obtained by simple condensation and water (Continued)

removal of a hydrogen-containing product that is generated after entrance of a pyrolysis gas into the chemical looping hydrogen generation unit, no complex gas purification device is employed, and the costs for hydrogen generation are low.

3 Claims, 2 Drawing Sheets

(51) Int. Cl.
 *C10J 3/00* (2006.01)
 *F28F 17/00* (2006.01)
(52) U.S. Cl.
 CPC ............... *C01B 3/36* (2013.01); *C10J 3/005* (2013.01); *F22B 1/18* (2013.01); *F28F 17/005* (2013.01); *Y02E 50/14* (2013.01); *Y02P 20/124* (2015.11); *Y02P 20/129* (2015.11)

(56) References Cited

U.S. PATENT DOCUMENTS

| 9,518,236 B2* | 12/2016 | Fan .................... C10G 2/50 |
| 2005/0175533 A1* | 8/2005 | Thomas ............... C01B 3/063 423/657 |
| 2011/0303875 A1 | 12/2011 | Hoteit et al. | |

OTHER PUBLICATIONS

Wang Y, Hua X, Zhao C C, et al., Step-wise reduction kinetics of Fe2O3 by CO/CO2 mixtures for chemical looping hydrogen generation[J]. International Journal of Hydrogen Energy, 2017, 42(9): 5667-5675.

Zhu J, Wang W, Hua X, et al., Phase distribution and stepwise kinetics of iron oxides reduction during chemical looping hydrogen generation in packed bed reactors. International Journal of Hydrogen Energy, 2015, 40(36): 12097-12107.

Zhu J, Wang W, Hua X, et al., Simultaneous CO2 capture and H2 generation using Fe2O3/Al2O3 and Fe2O3/CuO/Al2O3 as oxygen carriers in single packed bed reactor via chemical looping process. Frontiers of Environmental Science & Engineering, 2015, 9(6): 1117-1129.

Hu Y, Wang W, Hua X., Reactivity of iron-based oxygen carriers prepared by wet and dry mixing methods for hydrogen production via biomass derived syngas chemical looping. Energy Procedia, 2014, 61: 1650-1654.

Chinese Patent Office. Office Action, dated Jul. 26, 2018. 5 pages.

\* cited by examiner

DEVICE AND METHOD FOR GENERATING HIGH-PURITY HYDROGEN BY BIOMASS PYROLYSIS-CHEMICAL LOOPING COMBUSTION

TECHNICAL FIELD

The present invention belongs to the field of hydrogen generation from biomass, and in particular relates to a device and method for generating high-purity hydrogen by biomass pyrolysis-chemical looping combustion, more particularly to generation of a pyrolysis gas by biomass pyrolysis and then generation of high-purity hydrogen by chemical looping combustion of the pyrolysis gas.

BACKGROUND

The current fossil fuel-based energy systems, though meeting the energy needs of economic and social development, have incurred severe regional and global environmental issues. As a clean energy, hydrogen generates only water while utilized, without causing pollutions to environments. However, approximately 96% of the current hydrogen stems from fossil energy, among which 48% comes from natural gas, 30% from tail gases of refineries and chemical plants, and 18% from coal. Besides, the principal emission $CO_2$ generated during the conversion process has not been effectively captured (IEA, 2007). This leads to the situation where those existing fossil-based hydrogen energy systems will still exacerbate the greenhouse effect. At the same time, fossil energy is a non-renewable one that likewise will face its depletion in the near future.

As a carbon neutral renewable energy, biomass is very widespread and in great abundance. Generating hydrogen from biomass, on the one hand, enables an efficient utilization of biomass resources, and on the other hand can attain renewable low-carbon hydrogen to ensure that hydrogen energy systems are featured by environmental friendliness and sustainability.

At present, the technologies of generating hydrogen from biomass are mainly divided into two categories: one involves biological methods in which hydrogen is generated in a biological fashion, e.g. photo-fermentation, anaerobic fermentation, biophotolysis of water, biological photo-fermentation and the like; and the other category refers to thermochemical methods in which hydrogen generation is done by thermochemical reactions of the raw material biomass, such as hydrogen generation by pyrolysis/gasification, hydrogen generation by supercritical conversion, hydrogen generation by plasma gasification, etc. These two categories of methods have their characteristics and have been greatly developed for the past few years. But in general, hydrogen generation by biological methods is mostly suitable for medium- and small-scale applications due to its relatively stringent biological growth conditions and slower reaction rates, whereas both hydrogen generation by supercritical conversion and hydrogen generation by plasma gasification necessitate high temperatures during their reactions, and this consequently lead to unacceptable energy consumptions. As a result, further development needs to be made for all these technologies. Hydrogen generation by biomass pyrolysis/gasification, however, can draw lessons from those comparatively well-developed coal gasification technologies, and thus has high reaction rate and relatively moderate reaction conditions and also is easy to realize mass generation, making itself highly promising in the field of hydrogen generation from biomass, especially in the field of hydrogen generation from biomass that is hardly degradable.

The conventional procedure for hydrogen generation by biomass pyrolysis/gasification is to convert hydrocarbons in biomass into combustible components, e.g. CO, $H_2$, $CH_4$ and tar, under certain thermochemical conditions, then further convert macromolecular substances, such as tar, in the gasification product into small molecule gases through catalytic cracking and convert CO, $CH_4$ and other such gases in the cracked product into $H_2$ and $CO_2$ through steam reforming, and finally subject the resulting gas to purification, decarburization and other such processes to produce high-purity hydrogen. This technical route of gasification, cracking, reforming, purification and decarburization has made it possible to generate high-purity hydrogen from biomass. But since it has a considerable length, numerous disadvantages arise, such as, increased operational complexity, higher energy consumption and a substantial increase in hydrogen generation costs.

SUMMARY OF THE INVENTION

In view of the problem that the current process flow of generating high-purity hydrogen by biomass pyrolysis and gasification is overly long, the present invention is to provide a device and method for generating high-purity hydrogen by biomass pyrolysis-chemical looping combustion. This device and method, on the one hand, enables low-cost $CO_2$ capture as well as thermal energy supply, and on the other hand, with simple condensation and water removal, the generated hydrogen-containing product can result in high-purity hydrogen, achieving a significant decrease in hydrogen generation costs.

To address the technical problem mentioned above, the technical solution adopted by the present invention is as follows:

In a first aspect, a device for generating high-purity hydrogen by biomass pyrolysis-chemical looping combustion is characterized in that the device comprises a biomass pyrolysis unit, a chemical looping hydrogen generation unit and a waste heat recovery unit.

The biomass pyrolysis unit comprises a vertical bin, a screw feeder, a rotary kiln pyrolysis reactor and a high temperature filter, the vertical bin conveys raw materials into the rotary kiln pyrolysis reactor through the screw feeder, and the rotary kiln pyrolysis reactor is connected with the high temperature filter through a pyrolysis gas delivery pipe.

The chemical looping hydrogen generation unit comprises a path switching system of intake gas end, at least one packed bed reactor and a path switching system of tail gas end; the two ends of the packed bed reactor are respectively connected with the path switching system of intake gas end and the path switching system of tail gas end; each packed bed reactor undergoes a different reaction stage from others, at the same moment, by the control of the path switching system of intake gas end and the path switching system of tail gas end; and for a packed bed reactor, it undergoes different reaction stages at different moment, by the control of the path switching system of intake gas end and the path switching system of tail gas end;

The waste heat recovery unit comprises at least one waste heat boiler, at least one cooler and at least one gas-liquid separator; an outlet of the waste heat boiler is communicated with an inlet of the cooler through a first tail gas delivery pipe, and an outlet of the cooler is communicated with an inlet of the gas-liquid separator through a second tail gas delivery pipe.

In combination with the first aspect and in a first possible implementation, the biomass pyrolysis unit further comprises a biochar collection sump, and the rotary kiln pyrolysis reactor delivers the generated biochar to the biochar collection sump through a biochar delivery pipe.

In combination with the first aspect and in a second possible implementation, the number of the packed bed reactors is three, and under the control of the path switching system of intake gas end and the path switching system of tail gas end, the three packed bed reactors are respectively at a fuel reduction stage, a steam oxidation stage, and an air combustion stage.

In combination with the second possible implementation of the first aspect and in a third possible implementation, the path switching system of intake gas end and the path switching system of tail gas end control the packed bed reactors to undergo different reaction stages by means of opening and closing of at least one control valve.

In combination with the third possible implementation of the first aspect and in a fourth possible implementation, the pyrolytic reaction temperature of the biomass pyrolysis unit is 400° C. to 900° C., the reaction temperature of the fuel reduction stage in the chemical looping hydrogen generation unit is 700° C. to 1100° C., the reaction temperature of the steam oxidation stage is 700° C. to 1100° C., and the reaction temperature of the air combustion stage is 700° C. to 1100° C.

In combination with the first aspect and in a fifth possible implementation, a water inlet end of the waste heat boiler is connected to a soft water inlet main pipe of the boiler, through a soft water delivery pipe of the boiler; a gas outlet end of the waste heat boiler is connected to a steam main pipe of waste heat recovery device through a steam delivery pipe; the cooler is connected to a main pipe of circulated cooling water inlet through a circulated cooling water inlet pipe, and the cooler is connected to a main pipe of circulated cooling water outlet through a circulated cooling water outlet pipe.

In combination with the fifth possible implementation of the first aspect and in a sixth possible implementation, the waste heat recovery unit is further connected with a hydrogen output pipe or a tail gas emptying pipe.

In a second aspect, a method for generating high-purity hydrogen by biomass pyrolysis-chemical looping combustion is characterized in that: biomass is pyrolyzed into a pyrolysis gas at first and then the pyrolysis gas is used as a fuel for the chemical looping hydrogen generation unit to generate high-purity hydrogen, with the method being specifically as follows:

A. biomass pyrolysis: the biomass in the vertical bin is pushed by the screw feeder to enter the rotary kiln pyrolysis reactor for pyrolysis, and the resulting pyrolysis gas, after dust removal by the high temperature filter, enters the chemical looping hydrogen generation unit via a fuel gas delivery pipe.

B. chemical looping hydrogen generation: the pyrolysis gas enters into the packed bed reactor which is undergoing the reduction stage, wherein the packed bed reactor is within the chemical looping hydrogen generation unit, and in the meantime the remaining packed bed reactors undergo the steam oxidation stage and the air combustion stage; the packed bed reactors are all successively subjected to the fuel reduction stage, the steam oxidation stage and the air combustion stage under the control of the path switching system of intake gas end and the path switching system of tail gas end, to generate high-purity hydrogen continuously;

C. waste heat recovery: the gas that is generated by reacting with an iron-based oxygen carrier during the fuel reduction stage, the steam oxidation stage and the air combustion stage in step B enters into the waste heat recovery unit to achieve heat recovery. In combination with the second aspect and in a first possible implementation, the steam enters into the packed bed reactor which is undergoing the steam oxidation stage, and reacts with the oxygen carrier reduced by the pyrolysis gas, to generate $H_2$ and $H_2O(g)$; $H_2$ and $H_2O(g)$ generated from the reaction enter a tail gas waste heat recovery unit via a tail gas delivery pipe at the steam oxidation stage, and high-purity $H_2$, which is subjected to heat recovery and water removal by condensation, enters an $H_2$ output pipe.

In combination with the second aspect and in a second possible implementation, after the complete reaction of the oxygen carrier in the packed bed reactor which is undergoing the air combustion stage, the packed bed reactor at the air combustion stage enters the fuel reduction stage, by the control of the path switching system of intake gas end and the path switching system of tail gas end, while the remaining packed bed reactors enter the steam oxidation stage and the air combustion stage successively.

Compared with the prior art, the device and method for generating high-purity hydrogen by biomass pyrolysis-chemical looping combustion provided in the present invention realize the technical effects that follow:

1. The tar-containing biomass pyrolysis gas directly enters a fuel reactor where tar is converted using the oxygen carrier, so use of a tar treatment device is unnecessary.
2. The process flow is greatly shortened, high-purity $H_2$ can be obtained by simple condensation and water removal of the $H_2$-containing product that is generated from the dust-removed biomass pyrolysis gas in the chemical looping hydrogen generation unit, no complex gas purification device is employed and thus it is easy to operate, and the costs for hydrogen generation are low.
3. With steam as a purging gas, dilution of $CO_2$ generated during the combustion reduction stage can be avoided, and accordingly high carbon capture efficiency in the system is ensured.
4. Since bio-hydrogen inherently possesses the characteristic of carbon neutral, the present invention enables $CO_2$ capture while generating bio-hydrogen, the bio-hydrogen generated according to the present invention is imparted with the characteristic of "carbon negative".
5. All of the tail gas from the outlet of the chemical looping hydrogen generation unit makes its way into the waste heat recovery unit for waste heat recovery, thereby improving the system's energy efficiency.

Figure 1:
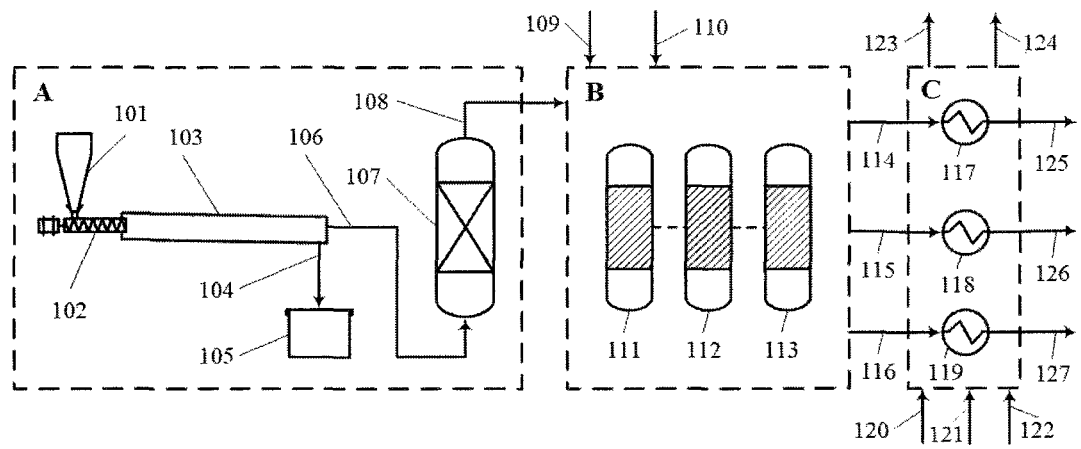
FIG. 1 is a schematic diagram of a device for generating high-purity hydrogen by biomass pyrolysis-chemical looping combustion in embodiment 1.

Reference numerals: A—biomass pyrolysis unit; B—chemical looping hydrogen generation unit; C—waste heat recovery unit; 101—vertical bin; 102—screw feeder; 103—rotary kiln pyrolysis reactor; 104—biochar delivery pipe; 105—biochar collection sump; 106—pyrolysis gas delivery pipe; 107—high temperature filter; 108—fuel gas delivery pipe; 109—steam inlet main pipe; 110—air inlet main pipe; 111—packed bed reactor I; 112—packed bed reactor II; 113—packed bed reactor III; 114—tail gas delivery pipe of the fuel reduction stage; 115—tail gas delivery pipe of oxidation stage; 116—tail gas delivery pipe of air combustion stage; 117—tail gas waste heat recovery unit of fuel reduction stage; 118—tail gas waste heat recovery unit of steam oxidation stage; 119—tail gas waste heat recovery unit of air combustion stage; 120—soft water inlet main pipe of the boiler; 121—main pipe of circulated cooling water inlet; 122—main pipe of condensed water outlet; 123—steam main pipe of waste heat recovery device; 124—main pipe of circulated cooling water outlet; 125—$CO_2$ output pipe; 126—$H_2$ output pipe; 127—tail gas emptying pipe. 201—inlet fuel gas control valve of packed bed reactor I; 202—inlet steam control valve of packed bed reactor I; 203—inlet air control valve of packed bed reactor I; 204—inlet fuel gas control valve of packed bed reactor II; 205—inlet steam control valve of packed bed reactor II; 206—inlet air control valve of packed bed reactor II; 207—inlet fuel gas control valve of packed bed reactor III; 208—inlet steam control valve of packed bed reactor III; 209—inlet air control valve of packed bed reactor III; 210—tail gas control valve of packed bed reactor I of fuel reduction stage; 211—tail gas control valve of packed bed reactor I of undergoing steam oxidation stage; 212—tail gas control valve of packed bed reactor I of air combustion stage; 213—tail gas control valve of packed bed reactor II of fuel reduction stage; 214—tail gas control valve of packed bed reactor II of steam oxidation stage; 215—tail gas control valve of packed bed reactor II of air combustion stage; 216—tail gas control valve of packed bed reactor III of fuel reduction stage; 217—tail gas control valve of packed bed reactor III of steam oxidation stage; 218—tail gas control valve of packed bed reactor III of air combustion stage. 301—waste heat boiler; 302—soft water delivery pipe of the boiler; 303—steam delivery pipe; 304—tail gas delivery pipe of fuel reduction stage after heat recovery; 305—cooler; 306—circulated cooling water inlet pipe; 307—circulated cooling water outlet pipe; 308—tail gas delivery pipe of fuel reduction stage after cooling; 309—gas-liquid separator; 310—condensed water delivery pipe.

DETAILED DESCRIPTION OF THE INVENTION

The present invention will be further described below in details by reference to the accompanying drawings, and yet the description is not intended to limit the present invention.

Embodiment 1

In a preferred embodiment of the present invention, as shown in FIG. 1, a device for generating high-purity hydrogen by biomass pyrolysis-chemical looping combustion comprises a biomass pyrolysis unit A, a chemical looping hydrogen generation unit B and a waste heat recovery unit C.

The biomass pyrolysis unit A comprises a vertical bin 101, a screw feeder 102, a rotary kiln pyrolysis reactor 103 and a high temperature filter 107, the vertical bin 101 conveys raw materials into the rotary kiln pyrolysis reactor 103 through the screw feeder 102, biochar generated by the rotary kiln pyrolysis reactor 103 enters into a biochar collection sump 105 via a biochar delivery pipe 104, the rotary kiln pyrolysis reactor 103 conveys the generated pyrolysis gas into a high temperature filter 107 through a pyrolysis gas delivery pipe 106, and the dust-removed pyrolysis gas enters into the chemical looping hydrogen generation unit B as a fuel via a fuel gas delivery pipe 108.

The chemical looping hydrogen generation unit B comprises a path switching system of intake gas end, at least one packed bed reactor and a path switching system of tail gas end; the two ends of the packed bed reactor are respectively connected with the path switching system of intake gas end and the path switching system of tail gas end, and at least one packed bed reactor undergoes different reaction stages under the control of the path switching system of intake gas end and the path switching system of tail gas end.

Wherein the number of the packed bed reactors is three, i.e. a packed bed reactor I 111, a packed bed reactor II 112 and a packed bed reactor III 113, and these three packed bed reactors are arranged in parallel with each other.

Figure 2:
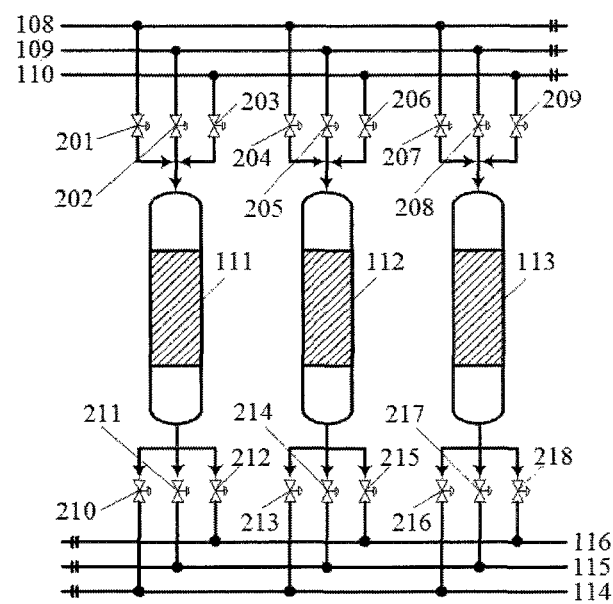
FIG. 2 is a schematic diagram of a chemical looping hydrogen generation unit in embodiment 1.

As shown in FIG. 2, the path switching system of intake gas end comprises: an inlet fuel gas control valve of packed bed reactor I 201, an inlet steam control valve of packed bed reactor I 202 and an inlet air control valve of packed bed reactor I 203; an inlet fuel gas control valve of packed bed reactor II 204, an inlet steam control valve of packed bed reactor II 205 and an inlet air control valve of packed bed reactor II 206; an inlet fuel gas control valve of packed bed reactor III 207, an inlet steam control valve of packed bed reactor III 208 and an inlet air control valve of packed bed reactor III 209.

The path switching system of tail gas end comprises: a tail gas control valve of packed bed reactor I of fuel reduction stage 210, a tail gas control valve of packed bed reactor I of undergoing steam oxidation stage 211 and a tail gas control valve of packed bed reactor I of air combustion stage 212; a tail gas control valve of packed bed reactor II of fuel reduction stage 213, a tail gas control valve of packed bed reactor II of steam oxidation stage 214 and a tail gas control valve of packed bed reactor II of air combustion stage 215; a tail gas control valve of packed bed reactor III of fuel reduction stage 216, a tail gas control valve of packed bed reactor III of steam oxidation stage 217 and a tail gas control valve of packed bed reactor III of air combustion stage 218.

At the same moment, the path switching system of intake gas end and the path switching system of tail gas end, in different states of valve opening and closing, control the three packed bed reactors to be at the fuel reduction stage, the steam oxidation stage and the air combustion stage, respectively. And at different moments, the path switching system of intake gas end and the path switching system of tail gas end, in different states of valve opening and closing, control a packed bed reactor to enter different reaction states, i.e. fuel reduction reaction state, steam oxidation reaction state, and air combustion reaction state successively. Wherein the pyrolytic reaction temperature of biomass pyrolysis unit A is 400° C. to 900° C., the reaction temperature of fuel reduction stage in the chemical looping hydrogen generation unit B is 700° C. to 1100° C., the reaction temperature of steam oxidation stage is 700° C. to 1100° C., and reaction temperature of the air combustion stage is 700° C. to 1100° C.

Specifically, when the inlet fuel gas control valve of packed bed reactor I 201, the inlet steam control valve of packed bed reactor II 205, the inlet air control valve of packed bed reactor III 209, the tail gas control valve of packed bed reactor I of fuel reduction stage 210, the tail gas control valve of packed bed reactor II of steam oxidation stage 214, and the tail gas control valve of packed bed reactor III of air combustion stage 218 are in an open state while the other control valves are in a closed state, the packed bed reactor I 111 is at the fuel reduction stage and serves as a fuel reactor, the clean pyrolysis gas from a fuel gas delivery pipe 108 reacts with an iron-based oxygen carrier ($Fe_2O_3$) to generate $CO_2$ and $H_2O(g)$, and the gas enters into a tail gas delivery pipe of fuel reduction stage 114; the packed bed reactor II 112 is at the steam oxidation stage and serves as a steam reactor, steam from a steam inlet main pipe 109 reacts with a reduced oxygen carrier (Fe/FeO), and $H_2$ and $H_2O(g)$ generated by this reaction enters into a tail gas delivery pipe of oxidation stage 115; the packed bed reactor III 113 is at the air combustion stage and serves as an air reactor, air from an air inlet main pipe 110 reacts with a steam-oxidized oxygen carrier ($Fe_3O_4$), tail gas generated by this reaction enters into a tail gas delivery pipe of air combustion stage 116, and this corresponds to a T1 time period in the table of timing control for chemical looping hydrogen generation device (Table 1). Table 1 represents the opening and closing states of the individual control valves within six time periods T1-T6 during a complete chemical looping hydrogen generation cycle, as well as the states of the corresponding packed bed reactors 111 to 113.

TABLE 1

Table of Timing Control for Chemical Looping Hydrogen Generation Device

| | T1 | T2 | T3 | T4 | T5 | T6 |
|---|---|---|---|---|---|---|
| 111 | Red | Red | Oxid | Oxid | Comb | Purg |
| 112 | Oxid | Oxid | Comb | Purg | Red | Red |
| 113 | Comb | Purg | Red | Red | Oxid | Oxid |
| 201 | • | • | | | | |
| 202 | | | • | • | | • |
| 203 | | | | • | | |
| 204 | | | | • | • | |
| 205 | • | • | | • | | |
| 206 | | | • | | | |
| 207 | | | • | • | | |
| 208 | | • | | | • | • |
| 209 | • | | | | | |
| 210 | • | • | | | | |
| 211 | | | • | | • | |
| 212 | | | | | • | • |
| 213 | | | | | • | • |
| 214 | • | • | | | | |
| 215 | | | • | • | | |
| 216 | | | • | • | | |
| 217 | | | | | • | • |
| 218 | • | • | | | | |

Notes:
T1-T6 refer to dissimilar time periods within one cycle period;
Red, Oxid, Comb and Purg respectively indicate that the packed bed reactors undergo fuel reduction, steam oxidation, air combustion and steam purging stages, wherein steam purging occurs during the air combustion stage;
• indicates that the control valve is in an open state within this time period, while blank denotes that the control valve is in a closed state within this time period.

Figure 3:
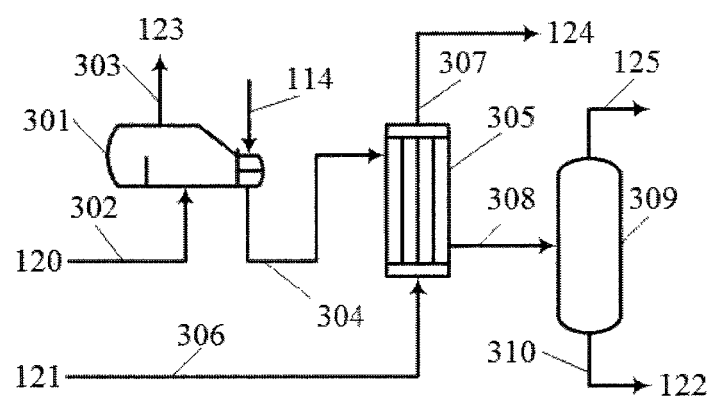
FIG. 3 is a schematic diagram of a waste heat recovery unit for tail gas at a fuel reduction stage in embodiment 1.

As shown in FIG. 3, the waste heat recovery unit C for the tail gas at fuel reduction stage comprises a waste heat boiler 301, a cooler 305 and a gas-liquid separator 309. Wherein the first tail gas delivery pipe is a tail gas delivery pipe of fuel reduction stage after heat recovery 304; and the second tail gas delivery pipe is a tail gas delivery pipe of fuel reduction stage after cooling 308. The specific structure is as follows.

The tail gas delivery pipe of fuel reduction stage 114 connects the chemical looping hydrogen generation unit with a heat medium inlet of the waste heat boiler 301; the tail gas delivery pipe of fuel reduction stage after heat recovery 304 connects a tail gas outlet of the waste heat boiler 301 with an inlet of the cooler 305; the tail gas delivery pipe of fuel reduction stage after cooling 308 connects an outlet of the cooler 305 with an inlet of the gas-liquid separator 309; the water-removed tail gas at fuel reduction stage enters into a $CO_2$ output pipe via a gas outlet of the gas-liquid separator 309; the waste heat boiler 301 is connected with a soft water inlet main pipe of the boiler 120 through a soft water delivery pipe of the boiler 302; the waste heat boiler 301 is connected with a steam main pipe of waste heat recovery device 123 through a steam delivery pipe 303; the cooler 305 is connected with a main pipe of circulated cooling water inlet 121 through a circulated cooling water inlet pipe 306; and the cooler 305 is connected with a main pipe of circulated cooling water outlet 124 through a circulated cooling water outlet pipe 307.

The waste heat recovery unit for the tail gas at steam oxidation stage and air combustion stage is similar to this, and accordingly the tail gas at steam oxidation stage is treated by a tail gas waste heat recovery unit of steam oxidation stage 118 before entering an $H_2$ output pipe 126; and the tail gas at air combustion stage is treated by a tail gas waste heat recovery unit of air combustion stage 119 before entering a tail gas emptying pipe 127. Provided in this embodiment is a device for generating high-purity hydrogen by biomass pyrolysis-chemical looping combustion. The tar-containing biomass pyrolysis gas directly enters into a fuel reactor where tar is converted using the oxygen carrier, so the tar treatment device is unnecessary and the complexity of the device is lowered. All of the tail gas from the outlet of the chemical looping hydrogen generation unit B makes its way into the waste heat recovery unit C for waste heat recovery, thereby improving the system's energy efficiency.

Embodiment 2

Provided in this embodiment is a method for generating high-purity hydrogen by biomass pyrolysis-chemical looping combustion. As shown in FIG. 1, FIG. 2 and FIG. 3, biomass is pyrolyzed into a pyrolysis gas at first and then the pyrolysis gas is used as a fuel for the chemical looping hydrogen generation unit to generate high-purity hydrogen, with the method being specifically as follows:

A mixture of dry sludge and furfural residue in the vertical bin 101 is pushed by the screw feeder 102 to enter the rotary kiln pyrolysis reactor 103 for pyrolysis at 600° C., with the main products being pyrolysis gases like CO, $H_2$, etc. The resulting pyrolysis gas, after dust removal by the high temperature filter 107, enters the chemical looping hydrogen generation unit B via the fuel gas delivery pipe 108. The biochar generated by pyrolysis of the rotary kiln pyrolysis reactor 103 enters the biochar collection sump 105 via the biochar delivery pipe 104.

The clean pyrolysis gas from the fuel gas delivery pipe 108 enters the packed bed reactor I 111 which is undergoing fuel reduction stage and reacts with an oxygen carrier, which is CuO-modified $Fe_2O_3/Al_2O_3$, at a temperature of 900° C. $CO_2$ and $H_2O(g)$ generated by this reaction enter the tail gas waste heat recovery unit of fuel reduction stage 117 via the tail gas delivery pipe of fuel reduction stage 114. After heat is recovered in the waste heat boiler 301, the gas enters the cooler 305 and is further cooled to condense water, followed by entrance into the gas-liquid separator 309 to remove the condensed water. The water-removed pure $CO_2$ enters the $CO_2$ output pipe 125.

And meanwhile, steam from the steam inlet main pipe 109 enters the packed bed reactor II 112 which is undergoing the steam oxidation stage and reacts with the oxygen carrier reduced by the pyrolysis gas at a temperature of 900° C. $H_2$ and $H_2O(g)$ generated from the reaction enter into the tail gas waste heat recovery unit of steam oxidation stage 118 via the tail gas delivery pipe of oxidation stage 115, and high-purity $H_2$, which is subjected to heat recovery and water removal by condensation, enters into the $H_2$ output pipe 126.

Air from the air inlet main pipe 110 enters the packed bed reactor III 113 which is undergoing the air combustion stage and reacts with a steam-oxidized oxygen carrier at a temperature of 900° C. Tail gas generated by this reaction enters into the tail gas waste heat recovery unit of air combustion stage 119 via the tail gas delivery pipe of air combustion stage 116, and the tail gas, which is subjected to heat recovery and water removal by condensation, enters into the tail gas emptying pipe 127. After the oxygen carrier in the packed bed reactor III 113 is completely oxidized, the inlet air control valve of packed bed reactor III 209 is closed, the inlet steam control valve 208 of packed bed reactor III 113 is opened, and the packed bed reactor III 113 enters the steam purging stage, which falls within the scope of the air combustion stage.

After purging is concluded, the inlet steam control valve 208 of packed bed reactor III 113 and the tail gas control valve 218 of packed bed reactor III 113 which is undergoing air combustion stage are closed, the inlet fuel gas control valve 207 of packed bed reactor III 113 and the tail gas control valve 216 of packed bed reactor III 113 which is undergoing fuel reduction stage are opened, and the packed bed reactor III 113 enters into the fuel reduction stage; and meanwhile, the inlet fuel gas control valve 201 of packed bed reactor I 111, the tail gas control valve 210 of packed bed reactor I 111 which is undergoing fuel reduction stage, the inlet steam control valve 205 of packed bed reactor II 112, the tail gas control valve 214 of packed bed reactor II 112 which is undergoing steam oxidation stage, the inlet steam control valve 202 of packed bed reactor I 111, the tail gas control valve 211 of packed bed reactor I 111 which is undergoing steam oxidation stage, the inlet air control valve 206 of packed bed reactor II 112, and the tail gas control valve 215 of packed bed reactor II 112 which is undergoing air combustion stage are opened, and the packed bed reactor I 111 and the packed bed reactor II 112 enter the steam oxidation stage and the air combustion stage, respectively. By the control of the path switching system of intake gas end and the path switching system of tail gas end, the packed bed reactor I 111, the packed bed reactor II 112 and the packed bed reactor III 113 are subjected to fuel reduction-steam oxidation-air combustion stages (steam purging stage) continuously and successively, and it is thus ensured that the system generates high-purity hydrogen in a continuous way.

In this embodiment, the feeding rate of the mixture of dry sludge and furfural residue is 2 kg/h, steam flow is 20 g/min, air flow is 10 L/min, the generated hydrogen flows out via the $H_2$ output pipe 126, and a multichannel gas analyzer is used to conduct online analysis on the hydrogen product, with the results given below:

TABLE 2

Conditions and Results of Hydrogen Generation by Biomass Pyrolysis-Chemical Looping Combustion Hydrogen Generation Device

| Implementation conditions | | |
|---|---|---|
| Biomass feeding rate | Steam flow | Air flow |
| 2 kg/h | 20 g/min | 10 L/min |
| Implementation results | | |
| $H_2$ content | CO content | $CO_2$ content |
| 98.5% | 0.4% | 1.1% |

Provided in this embodiment is a method for generating high-purity hydrogen by biomass pyrolysis-chemical looping combustion. The process flow is greatly shortened, high-purity $H_2$ can be obtained by simple condensation and water removal of the $H_2$-containing product that is generated from the dust-removed biomass pyrolysis gas in the chemical looping hydrogen generation unit, no complex gas purification device is employed and thus it is easy to operate, and the costs for hydrogen generation are low. With steam as a purging gas, dilution of $CO_2$ generated during the combustion reduction stage can be avoided, and accordingly high carbon capture efficiency in the system is ensured. Since bio-hydrogen inherently possesses the characteristic of carbon neutral and also the present invention enables $CO_2$ capture while generating bio-hydrogen, the bio-hydrogen generated according to the present invention is imparted with the characteristic of "carbon negative".

The above description illustrates and describes several preferred embodiments of the present invention, but as previously described, it is to be understood that the present invention is not limited to the forms disclosed herein, and that the present invention shall not be considered as excluding other embodiments, and instead can be used in various other combinations, modifications and environments and is capable of modifications within the scope of the inventive concept as expressed herein by the above teaching or techniques or knowledge in related arts. Any modifications or changes made by those skilled in the art that do not depart from the spirit and scope of the present invention shall fall within the scope of the appended claims of the present invention.

The invention claimed is:

1. A method for generating high-purity hydrogen by biomass pyrolysis-chemical looping combustion, wherein: biomass is pyrolyzed into a pyrolysis gas at first and then the pyrolysis gas is used as a fuel for a chemical looping hydrogen generation unit, comprising packed bed reactors I, II and III, to generate high-purity hydrogen, the method for generating high-purity hydrogen by biomass pyrolysis-chemical looping combustion comprises:

A. biomass pyrolysis: biomass in a vertical bin is pushed by a screw feeder to enter a rotary kiln pyrolysis reactor for pyrolysis, and the pyrolysis gas, after dust removal by a high temperature filter, enters the chemical looping hydrogen generation unit via a fuel gas delivery pipe;

B. chemical looping hydrogen generation, comprising a first stage, a second stage and a third stage successively, wherein:

(a) in the first stage, packed bed reactor I, undergoes a fuel reduction stage, packed bed reactor II undergoes a steam oxidation stage, packed bed reactor III undergoes an air combustion stage, and the pyrolysis gas enters into the packed bed reactor I;

(b) in the second stage, the packed bed reactor I undergoes the steam oxidation stage, the packed bed reactor II undergoes the air combustion stage, the packed bed reactor III undergoes the fuel reduction stage, and the pyrolysis gas enters into the packed bed reactor III; and (c) in the third stage, the packed bed reactor I undergoes the air combustion stage, the packed bed reactor II undergoes the fuel reduction stage, the packed bed reactor III undergoes the steam oxidation stage, and the pyrolysis gas enters into the packed bed reactor II; and wherein subjections of the packed bed reactors I, II and III to the fuel reduction stage, the steam oxidation stage and the air combustion stage are under a control of a path switching system of an intake gas end and a path switching system of a tail gas end, to generate high-purity hydrogen continuously, wherein the intake gas end is one or more of intakes of the packed bed reactor I, the packed bed reactor II and the packed bed reactor III, the tail gas end is one or more of the outlets of the packed bed reactor I, the packed bed reactor II and the packed bed reactor III; and C. waste heat recovery: gas that is generated by pyrolysis gas, steam or air reacting with an iron-based oxygen carrier during the fuel reduction stage, the steam oxidation stage and the air combustion stage in step B, enters into a waste heat recovery unit to achieve heat recovery.

2. The method according to claim 1, wherein a steam enters into one of the packed bed reactor I, the packed bed reactor II and the packed bed reactor III which is undergoing the steam oxidation stage, and reacts with an oxygen carrier reduced by the pyrolysis gas, to generate $H_2$ and $H_2O(g)$; the $H_2$ and $H_2O(g)$ generated from the reaction enter a tail gas waste heat recovery unit of the steam oxidation stage via a tail gas delivery pipe of the steam oxidation stage, and high-purity $H_2$, which is subjected to heat recovery and water removal by condensation, enters an $H_2$ output pipe.

3. The method according to claim 1, wherein after a complete reaction of the oxygen carrier in one of the packed bed reactor I, the packed bed reactor II and the packed bed reactor III which is undergoing the air combustion stage, one of the packed bed reactor I, the packed bed reactor II and the packed bed reactor III at the air combustion stage enters the fuel reduction stage, by the control of the path switching system of the intake gas end and the path switching system of the tail gas end; while one of the packed bed reactor I, the packed bed reactor II and the packed bed reactor III at the fuel reduction stage and the steam oxidation stage enter the steam oxidation stage and the air combustion stage successively.

* * * * *